(12) United States Patent
Conrad

(10) Patent No.: US 9,222,345 B2
(45) Date of Patent: *Dec. 29, 2015

(54) WELL FRACTURING SYSTEMS AND METHODS

(71) Applicant: Cameron International Corporation, Houston, TX (US)

(72) Inventor: Gregory A. Conrad, Calgary (CA)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,001

(22) Filed: Sep. 22, 2014

(65) Prior Publication Data

US 2015/0007997 A1    Jan. 8, 2015

Related U.S. Application Data

(63) Continuation of application No. 13/348,428, filed on Jan. 11, 2012, now Pat. No. 8,839,867.

(51) Int. Cl.
 E21B 43/26 (2006.01)
 E21B 34/14 (2006.01)
 E21B 43/247 (2006.01)

(52) U.S. Cl.
 CPC .............. *E21B 43/26* (2013.01); *E21B 34/14* (2013.01); *E21B 43/247* (2013.01)

(58) Field of Classification Search
 CPC ....... E21B 34/14; E21B 43/26; E21B 43/247; E21B 34/02; F16L 27/12
 See application file for complete search history.

(56) References Cited

U.S. PATENT DOCUMENTS

| | | | | |
|---|---|---|---|---|
| 1,615,536 | A | * | 1/1927 | Del Mar ..................... 285/32 |
| 3,233,668 | A | * | 2/1966 | Hamilton et al. ........... 166/259 |
| 4,355,961 | A | | 10/1982 | Riggs |
| 4,366,864 | A | | 1/1983 | Gibson et al. |
| 4,570,673 | A | | 2/1986 | Kendrick et al. |
| 4,603,887 | A | | 8/1986 | Mayfield et al. |
| 4,767,136 | A | | 8/1988 | Lehmann |
| 6,234,030 | B1 | | 5/2001 | Butler |
| 6,364,024 | B1 | | 4/2002 | Dallas |
| 8,839,867 | B2 | | 9/2014 | Conrad |
| 8,978,763 | B2 | | 3/2015 | Guidry |
| 2003/0205378 | A1 | | 11/2003 | Wellington et al. |
| 2003/0205385 | A1 | | 11/2003 | Duhn et al. |
| 2004/0251020 | A1 | | 12/2004 | Smith |
| 2008/0277120 | A1 | | 11/2008 | Hickie |
| 2009/0261575 | A1 | | 10/2009 | Bull et al. |
| 2010/0051261 | A1 | | 3/2010 | Koleilat et al. |
| 2010/0300672 | A1 | | 12/2010 | Childress et al. |
| 2011/0108275 | A1 | | 5/2011 | Borak et al. |
| 2011/0114320 | A1 | | 5/2011 | Sponchia et al. |
| 2011/0132596 | A1 | | 6/2011 | Yeh et al. |
| 2011/0259584 | A1 | * | 10/2011 | Broussard, II ............... 166/271 |
| 2012/0181015 | A1 | | 7/2012 | Kajaria et al. |
| 2013/0076026 | A1 | | 3/2013 | Guidry |

(Continued)

*Primary Examiner* — Yong-Suk (Philip) Ro
(74) *Attorney, Agent, or Firm* — Eubanks PLLC

(57) ABSTRACT

A fracturing system can include a fracturing manifold coupled to a plurality of fracturing trees. The fracturing manifold may include adjustment joints that enable adjustment of the length of the fracturing manifold. The fracturing manifold can also include pivot joints that allow angular displacement of portions of the fracturing manifold with respect to other portions. The adjustment and pivot joints can accommodate spacing and elevation differences between the fracturing trees.

14 Claims, 7 Drawing Sheets

(56) References Cited

U.S. PATENT DOCUMENTS

2013/0175039 A1 7/2013 Guidry
2015/0007998 A1 1/2015 Conrad

\* cited by examiner

WELL FRACTURING SYSTEMS AND METHODS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture or slurry including sand and water—into the well to increase the well's pressure and form the man-made fractures.

A fracturing manifold may provide fracturing fluid to one or more fracturing trees. Conventionally, the fracturing manifold is set back from the fracturing trees and valves of the manifold are tied to each fracturing tree by manifold output lines (e.g., "frac iron" or pipes) dedicated to routing fracturing fluid to that tree. To allow fracturing operations, the ends of each manifold output line are connected between the fracturing manifold and a respective fracturing tree. Further, the manifold output lines may be secured (e.g., via straps) to inhibit movement of the manifold output lines if the lines become disconnected from the manifold or their fracturing trees.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to a fracturing manifold coupled to one or more fracturing trees. Fracturing fluid can be routed from the fracturing manifold to the one or more fracturing trees and into wells. In one embodiment, the fracturing manifold includes an adjustment joint and a pivot joint. The adjustment and pivot joints facilitate connection of the manifold and allow the manifold to accommodate variations in well spacing and elevation.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
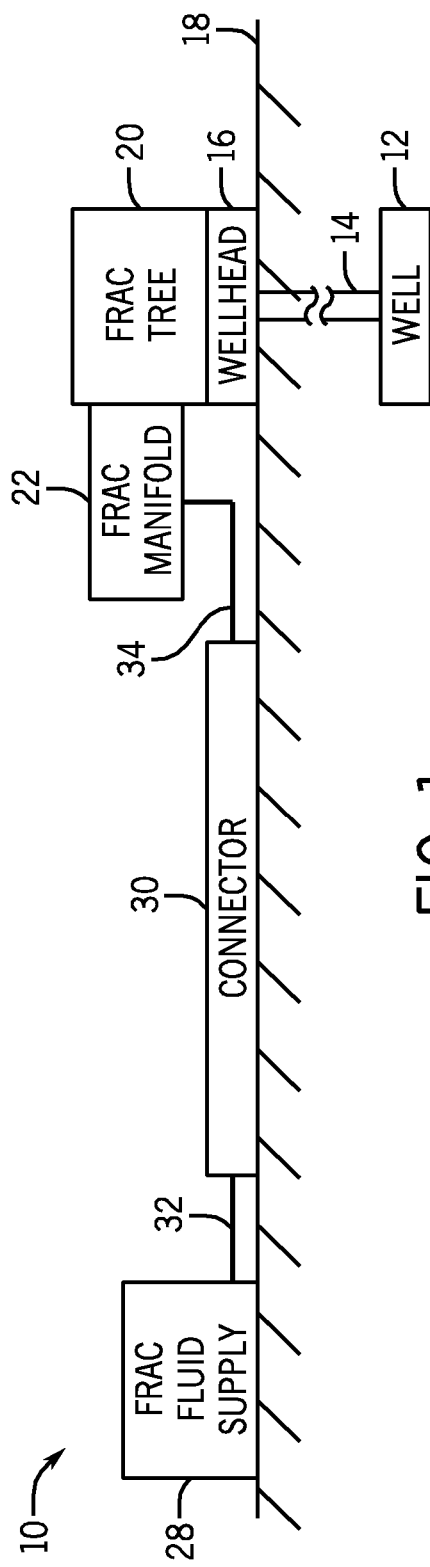
FIG. 1 generally depicts a fracturing system with an integral fracturing manifold in accordance with an embodiment of the present disclosure.
Figure 2:
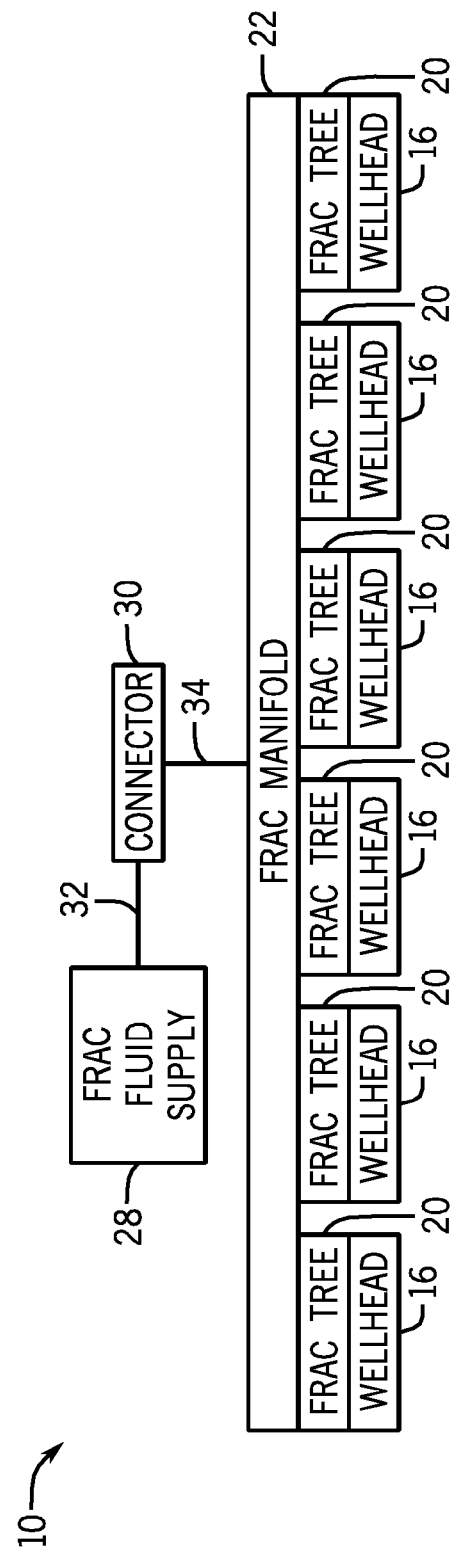
FIG. 2 is a diagram of the fracturing system of FIG. 1 with the integral fracturing manifold coupled to multiple fracturing trees in accordance with an embodiment of the present disclosure.

Turning now to the present figures, an example of a fracturing system 10 with an integral fracturing manifold is provided in FIGS. 1 and 2 in accordance with one embodiment. The fracturing system 10 facilitates extraction of natural resources (e.g., oil or natural gas) from a well 12 via one or more wellbores 14 and wellheads 16. Particularly, by injecting a fracturing fluid into the well 12, the fracturing system 10 increases the number or size of fractures in a rock formation or strata to enhance recovery of natural resources present in the formation. The fracturing fluid may, for example, include a sand-laden slurry (e.g., a pound of sand per gallon of water), drilling fluid, high concentrations of hydrochloric acid (e.g., up to mole percentage of eighteen percent), fresh water, saline water, or produced water. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control the flow of fracturing fluids into the well 12. For instance, the fracturing system 10 includes one or more fracturing trees 20 and a fracturing manifold 22. In at least one embodiment described in greater detail below with respect to FIGS. 3-5, the fracturing manifold 22 is integrated with the fracturing trees 20 (i.e., coupled without using separate output lines or frac iron to connect the fracturing manifold 22 and the fracturing trees 20). The fracturing trees 20 include at least one valve that controls flow of the fracturing fluid into the wellheads 16 and, subsequently, into the well 12.

As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. Fracturing fluid from a supply 28 is provided to the fracturing manifold 22. In FIG. 1, a connector 30 receives fracturing fluid from the supply 28 through a conduit or fluid connection 32 (e.g., pipes or hoses) and then transmits the fluid to the fracturing manifold 22 by way of a subterranean conduit or fluid connection 34 (e.g., pipes). In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners for transmitting such fluid to the fracturing manifold may instead be used.

Figure 3:
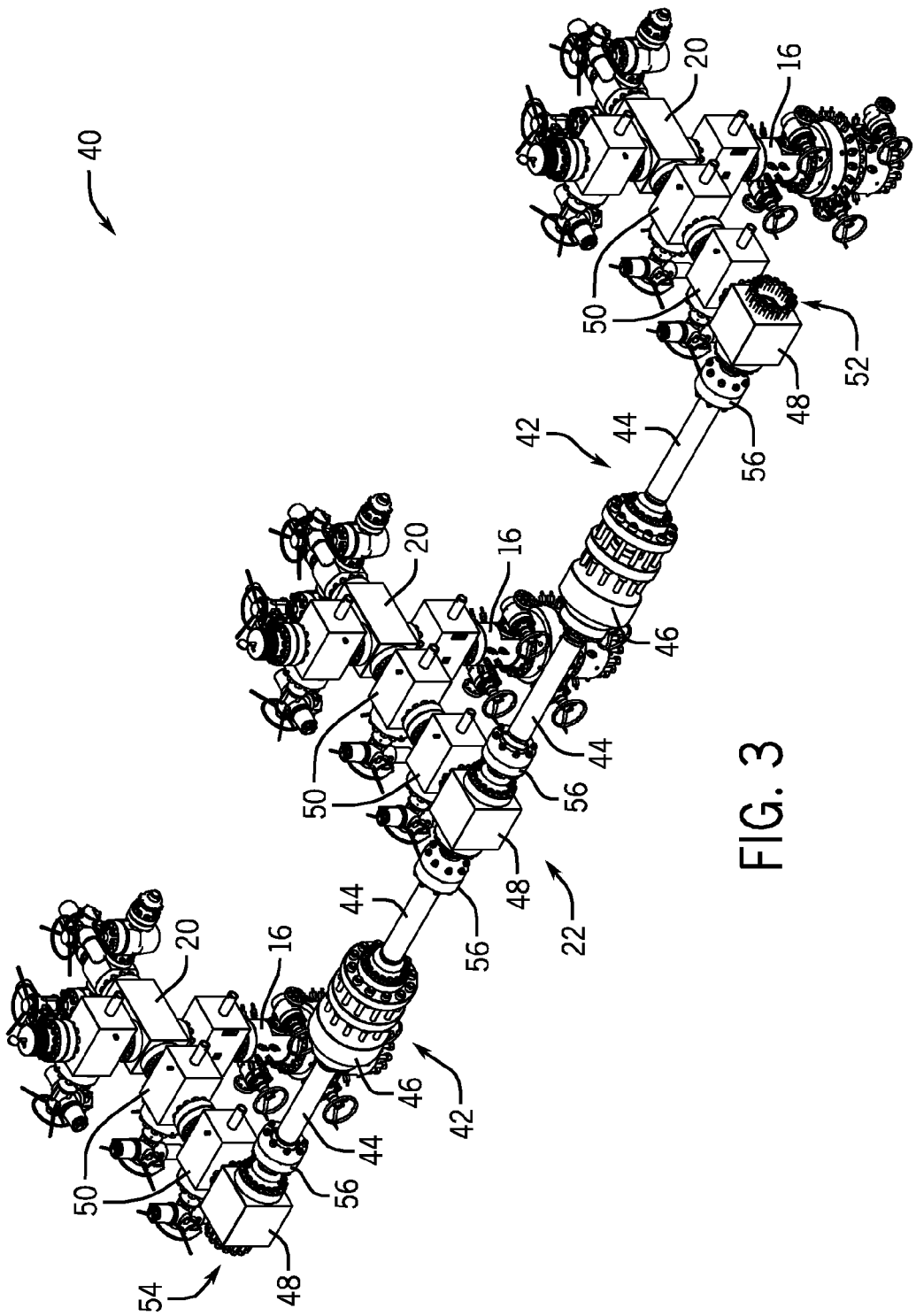
FIG. 3 is a perspective view of certain components of a fracturing system, including the integral fracturing manifold, fracturing trees, and adjustment joints, in accordance with an embodiment of the present disclosure.
Figure 4:
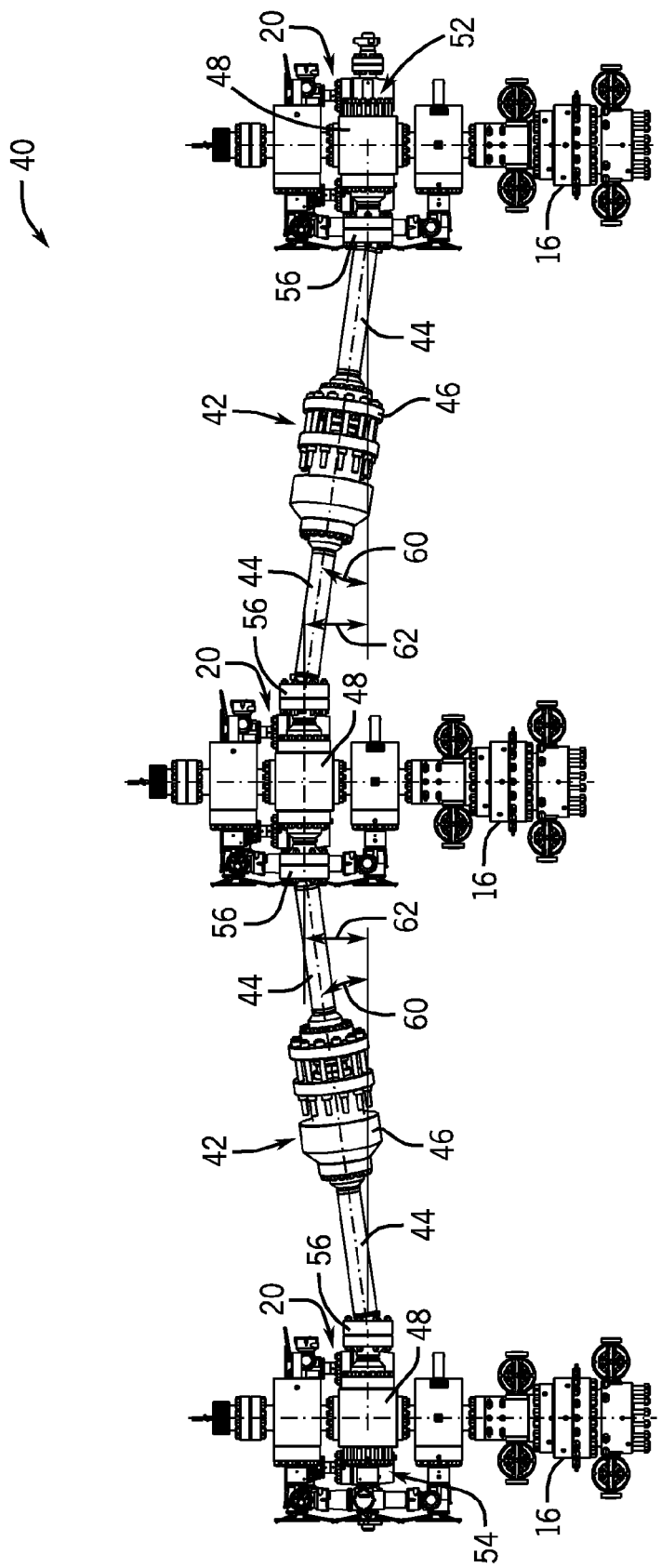
FIG. 4 is an elevational view of the fracturing system components depicted in FIG. 3.
Figure 5:
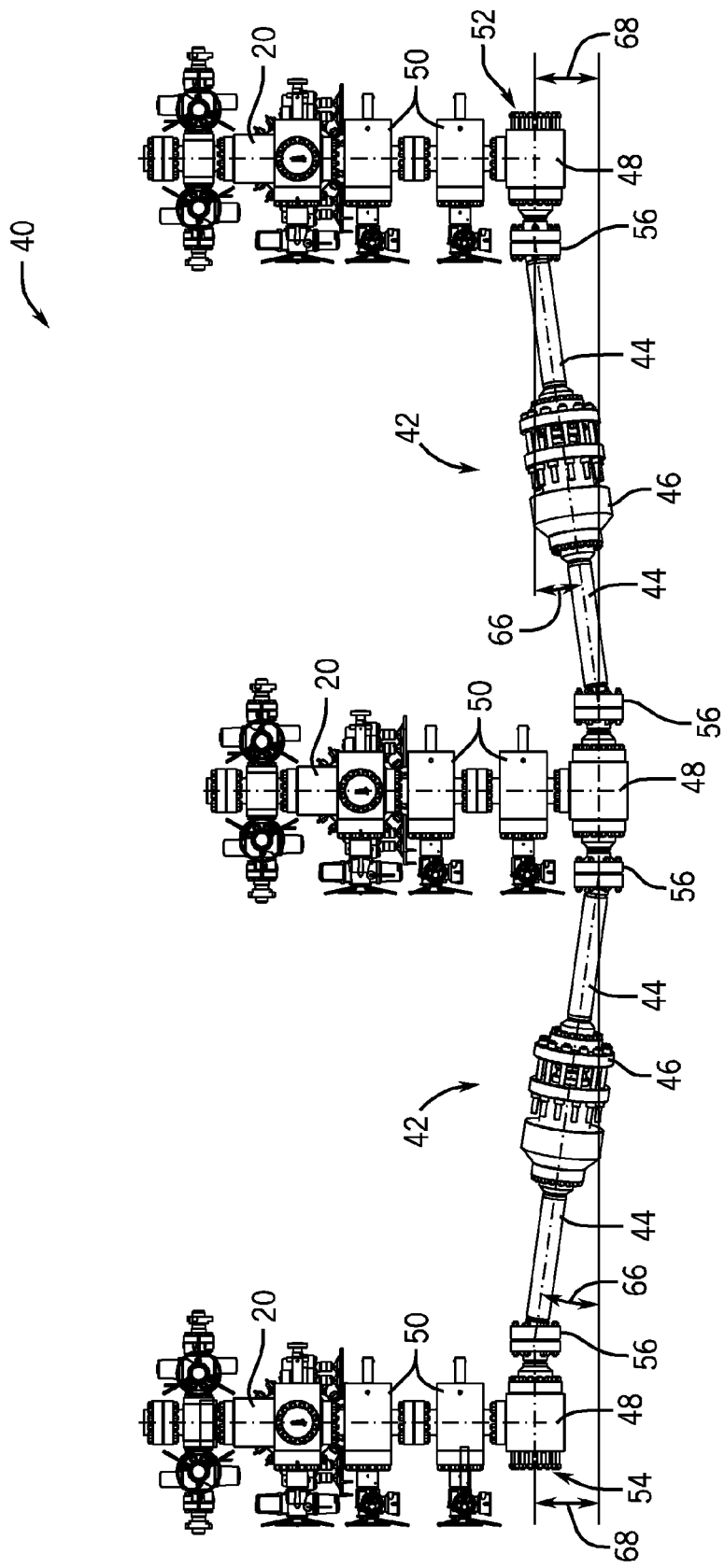
FIG. 5 is a top plan view of the fracturing system components depicted in FIGS. 3 and 4.

A portion 40 of the fracturing system 10 is illustrated in FIGS. 3-5 in accordance with one embodiment. In the depicted embodiment, the portion 40 includes several fracturing trees 20 joined to both wellheads 16 and the fracturing manifold 22. The manifold 22 includes a conduit 42 (also referred to as a main or shared trunk line) that routes fracturing fluid to the fracturing trees 20. The conduit 42, in turn, includes sections of pipe 44, adjustment joints 46, connection blocks 48, and pivot joints 56.

The components of the conduit 42 may have any bore diameter, material, and thickness appropriate for the intended application. For instance, in one fracturing application the conduit 42 includes a seven-inch bore and material (e.g., steel) with a thickness sufficient to sustain continuous delivery of fluid at high pressures (e.g., 15,000 psi). In another embodiment, the conduit 42 includes a three-inch bore.

In the presently depicted embodiment, the manifold 22 is an integral fracturing manifold. That is, rather than more conventional fracturing manifolds that are constructed to be installed (e.g., on the ground or a skid) apart and separate a distance from fracturing trees on wellheads and then connected to each fracturing tree with one or more manifold output lines (e.g., frac iron) specifically assigned to that fracturing tree, the manifold 22 is positioned right up to the fracturing trees without intervening frac iron, pipes, or fracturing heads. In such an integral fracturing manifold embodiment, the installed fracturing trees 20 and wellheads 16 provide stability, allow the omission of manifold skids, and consequently reduce leveling and settling issues related to such manifold skids.

In the depicted portion of the manifold 22, the connection blocks 48 themselves are coupled to valves 50 (e.g., gate valves) of the fracturing trees 20 to provide fracturing fluid to the fracturing trees 20. As will be appreciated, an operator may fracture a well 12 by opening the valves 50 of a particular fracturing tree 20 and allowing fracturing fluid to pass through that fracturing tree 20 into the associated well 12. The fracturing trees 20 and wellheads 16 may structurally support the manifold 22 by bearing some or all of its weight. But other support structures may also or instead be used to bear the weight of the manifold 22.

Further, by installing the fracturing manifold 22 on the fracturing trees 20 themselves, the overall footprint for fracturing operations is reduced, as is the number of components (and potential leak or failure points) in the system. For instance, rather than including valves on the manifold to control fluid output to the fracturing trees, the direct connection to the valves 50 of the fracturing trees 20 allow the integrated manifold 22 to omit separate valves on the manifold itself. Still further, in some instances (e.g., in extremely cold conditions) the fracturing trees 20 may be at least partially enclosed in temperature-controlled structures and the integration of the manifold 22 allow the manifold 22 to also benefit from the temperature-controlled structures. Accordingly, the integration of the manifold 22 with the fracturing trees 20 may reduce construction, installation, and operational costs associated with a fracturing operation.

The embodiment depicted in FIGS. 3-5 includes two valves 50 connecting each fracturing tree 20 to the fracturing manifold 22. But any other suitable number of valves may instead be used to control flow of fracturing fluid to the fracturing trees 20. Additionally, although the fracturing trees 20 are provided in the form of horizontal fracturing trees in the present embodiment, other embodiments may include different styles of fracturing trees (e.g., vertical trees). It is also noted that while three fracturing trees 20 are depicted in FIGS. 3-5, the integral fracturing manifold may be coupled to any number of fracturing trees in other embodiments. For instance, additional pipes 44, adjustment joints 46, connection blocks 48, or pivot joints 56 may be connected at ends 52 or 54 of the illustrated portion of the manifold 22 to transmit fracturing fluid to additional fracturing trees.

In a production field, wellheads may be unevenly spaced from one another and installed at different elevations. But in the depicted portion 40, the inclusion of adjustment joints 46 and pivot joints 56 in the integral fracturing manifold 22 facilitates installation of the manifold 22 on the fracturing trees 20 and allows accommodation of some variations in well spacing and elevation. Particularly, the adjustment joints 46 may be extended or retracted to adjust the length of the manifold 22 (and accommodate variations in distance between fracturing trees 20) and the pivot joints 56 (e.g., ball joints) allow portions of the manifold 22 to be positioned at angles with respect to one another (to accommodate one or both of elevation differences or non-linearity of spacing between fracturing trees 20).

By way of example, an elevational view of the portion 40 of the fracturing system 10 is provided in FIG. 4. In this illustration, the center wellhead 16 and fracturing tree 20 are at a higher elevation than those to the right and left, such as would occur if the center wellhead 16 was installed on a slight rise in the ground compared to the adjacent wellheads 16. The pivot joints 56 allow portions of the conduit 42 (e.g., the pipes 44 and adjustment joints 46 installed between two pivot joints 56) to be positioned at angles 60 to accommodate elevation differences 62. FIG. 4 generally depicts the left and right wellheads 16 (and fracturing trees 20) having similar elevation differences 62 with respect to the center wellhead 16 (and fracturing tree 20). But it will be appreciated that the respective elevation differences 62 between the outer wellheads 16 and the center wellhead 16, as well as the positioning angles 60 to compensate for such elevation differences 62, may vary from one another.

Similarly, the pivot joints 56 may also or instead accommodate lateral spacing deviations between adjacent wells as depicted in the top plan view of the portion 40 in FIG. 5. Particularly, the pivot joints 56 of the depicted embodiment also allow portions of the conduit 42 (e.g., the same pipes 44 and adjustment joints 46 noted above with respect to FIG. 4) to be positioned at angles 66 to accommodate lateral spacing differences 68 between wellheads 16 and fracturing trees 20. As above, the lateral spacing differences 68 need not be identical and may be different from one another depending on the position of the wellheads 16 and the fracturing trees 20.

The pivot joints 56 may be said to allow portions of the conduit 42 to be rotated in each of two perpendicular planes (e.g., vertical and horizontal with reference to the ground) to allow two degrees of translational freedom (e.g., up-and-down and left-and-right) in positioning a portion of the manifold 22. The amount of freedom provided may vary depending on the design of the fracturing system 10 and the dimensions of the pivot joints 56 and the other components of the manifold 22. In one embodiment, the pivot joints 56 may allow angular rotation of up to fifteen degrees from the normal (i.e., the angles 60 and 66 in their respective planes may vary between negative and positive fifteen degrees, inclusive).

Figure 6:
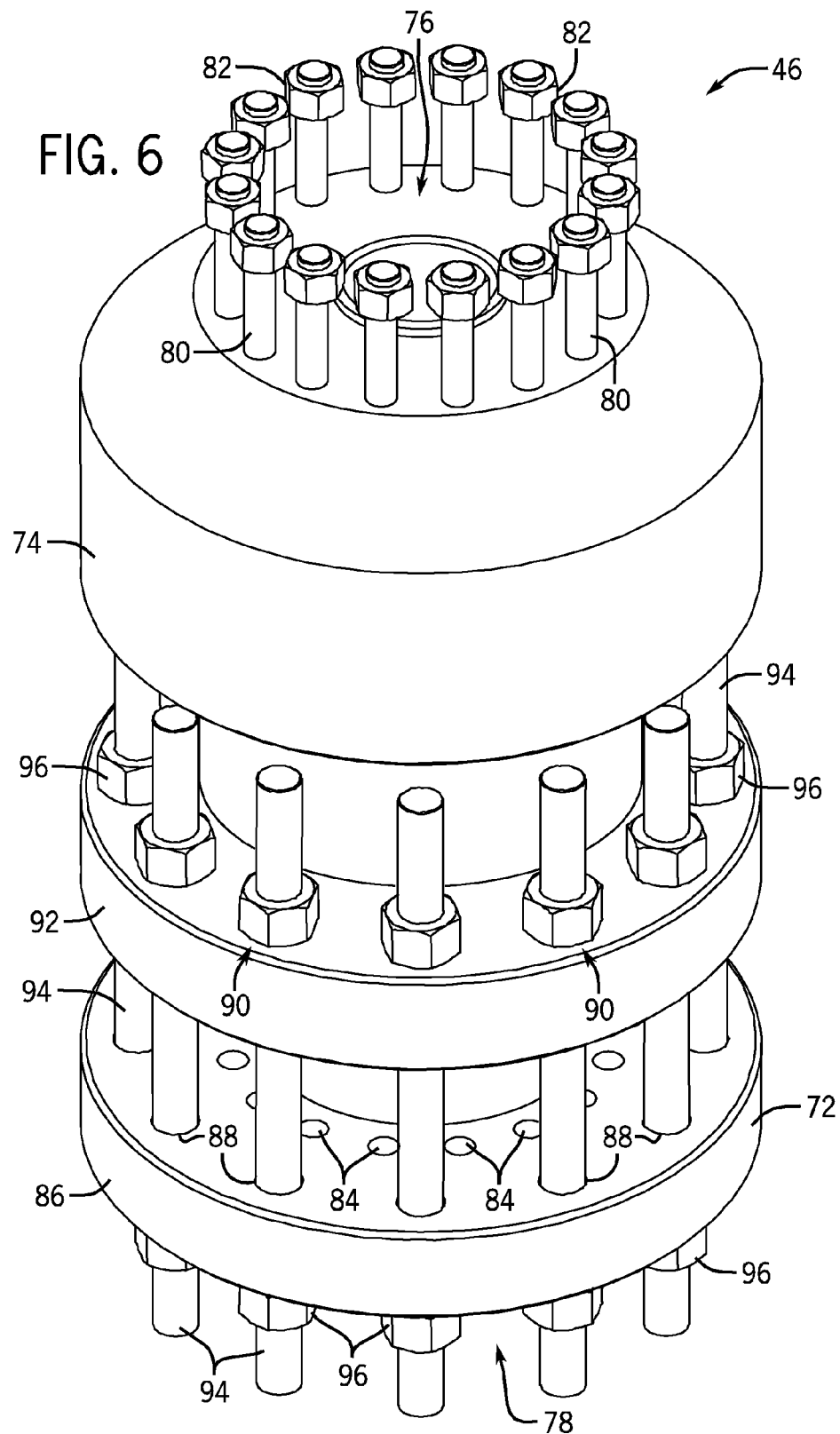
FIG. 6 is a perspective view of an adjustment joint as depicted in FIGS. 3-5 in accordance with an embodiment of the present disclosure.

The adjustment joints 46 provide a third degree of translational freedom (e.g., back-and-forth) by allowing variation in a dimension (e.g., length) of the adjustment joints 46 and, consequently, in the length of the conduit 42 between adjacent connection blocks 48. An adjustment joint 46 in accordance with one embodiment is illustrated in greater detail in FIGS. 6-8. But it is noted that other adjustment joints or connectors may instead be used in full accordance with the present technique.

In the depicted embodiment, the adjustment joint 46 includes a body having a first portion 72 and a second portion 74. The body portions 72 and 74 are configured to move with respect to one another to vary a dimension of the adjustment joint 46 and accommodate spacing and elevation differences between fracturing trees 20, as described above. The adjustment joint 46 includes fluid ports 76 and 78 to transmit fluid through the adjustment joint 46. In addition to the fluid port 76, the second body portion 74 includes a set of studs 80 and nuts 82 for connecting the adjustment joint 46 to another component (e.g., a flanged pipe 44). Similarly, the first body portion 72 includes through holes 84 arranged in a flange 86 about the fluid port 78 for coupling to another component (e.g., another flanged pipe 44 via additional studs and nuts). The first body portion 72 includes an additional set of through holes 88 positioned radially outward from the through holes 84. The through holes 88 are aligned with mating holes 90 in a flange 92 of the second body portion 74, and the first and second body portions 72 and 74 are secured to one another with studs 94 (through the holes 88 and 90) and nuts 96.

Figure 7:
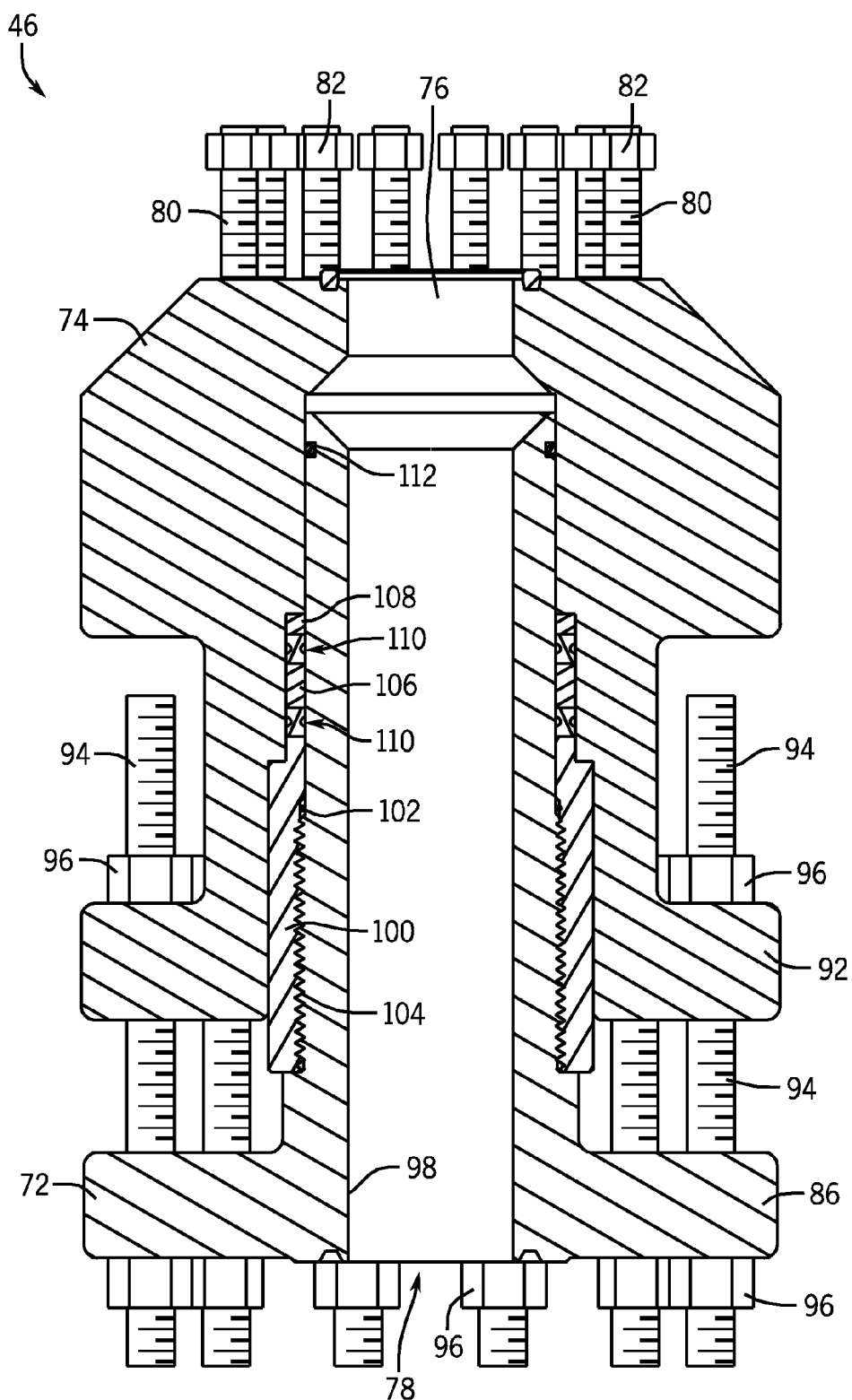
FIG. 7 is a cross-section of the adjustment joint of FIG. 6 in accordance with an embodiment of the present disclosure.
Figure 8:
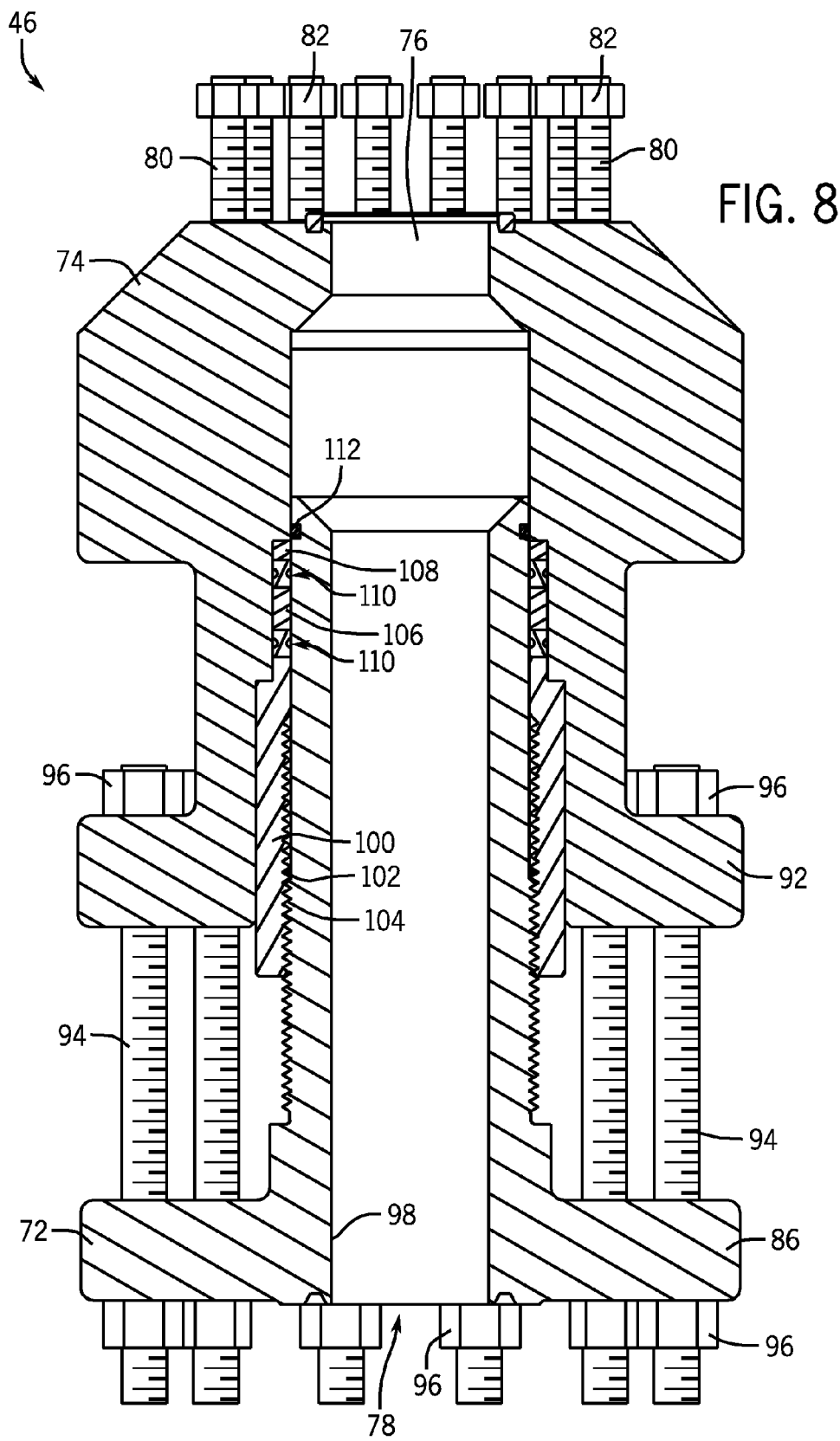
FIG. 8 generally depicts the adjustment joint of FIGS. 6 and 7 following adjustment to increase its length in accordance with an embodiment of the present disclosure.

As depicted in FIGS. 7 and 8, a bore 98 extends through the adjustment joint 46 between the fluid ports 76 and 78. The bore 98 may have a diameter similar or identical to that of the components coupled to the fluid ports 76 and 78, such as seven inches in one embodiment (though other diameters may be used for the bore 98, as well as for other components). The adjustment joint 46 includes an adjustment collar 100 that may be rotated on threads 104 by a user to translate the collar 100 with respect to the body portion 72 or 74 on which the collar is threaded (i.e., first body portion 72 in FIGS. 7 and 8). Movement of the adjustment collar 100 allows adjustment of the length of the adjustment joint 46 and the distance between fluid ports 76 and 78. Particularly, as illustrated in FIG. 8, nuts 96 may be loosened on the studs 94 and the adjustable collar 100 may be moved along the first body portion 72 to lengthen the adjustment joint 46. In this manner, the length (or what may instead be considered the height) of the adjustment joint 46 may be varied to aid in aligning and coupling the fracturing manifold 22 to the fracturing trees 20. The adjustment joint 46, or alternative adjustment joints in other embodiments, may be constructed to allow for any desired amount of variation in dimension. For instance, the adjustment joints may be constructed to allow dimensional variation (e.g., lengthening) of seven inches in one embodiment, of twelve inches in another embodiment, and of eighteen inches in still another embodiment.

The adjustment joint 46 also includes various sealing elements to inhibit fluid leakage. For instance, as depicted, the adjustment joint 46 includes sealing elements 102, 106, 108, 110, and 112. The sealing elements are formed of any suitable material, such as an elastomer or metal. In one embodiment, the seals 106 and 108 include CANH™ seals available from Cameron International Corporation of Houston, Tex. Also, in one embodiment movement of the collar 100 pre-loads or energizes one or more of the seals of the adjustment joint 46.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fracturing system, comprising:
a plurality of well fracturing trees; and
a fracturing manifold coupled to each of the plurality of well fracturing trees, wherein the fracturing manifold includes at least one adjustment joint that enables variation in the length of the fracturing manifold to accommodate variation in the distance between well fracturing trees of the plurality of well fracturing trees, and wherein the fracturing manifold includes at least one pivot joint and the fracturing manifold is coupled to a plurality of valves that enable individual control of flow of fracturing fluids from the fracturing manifold to the plurality of well fracturing trees.

2. The system of claim 1, wherein the plurality of well fracturing trees bear at least a portion of the weight of the fracturing manifold.

3. The system of claim 1, wherein the fracturing manifold includes a plurality of connection blocks and a plurality of pipe sections.

4. The system of claim 3, wherein each of the plurality of well fracturing trees is coupled to the fracturing manifold via a respective connection block of the plurality of connection blocks.

5. The system of claim 1, wherein the at least one pivot joint enables a first portion of the fracturing manifold to be positioned at an angle with respect to a second portion of the fracturing manifold to accommodate variation in spacing between well fracturing trees of the plurality of well fracturing trees.

6. The system of claim 1, wherein the at least one pivot joint enables a first portion of the fracturing manifold to be positioned at an angle with respect to a second portion of the fracturing manifold to accommodate elevation differences between well fracturing trees of the plurality of well fracturing trees.

7. The system of claim 1, wherein the at least one pivot joint includes at least one ball joint.

8. A fracturing system, comprising:
a well fracturing tree;
a fracturing manifold coupled to the well fracturing tree by one or more valves of the well fracturing tree to enable flow of fracturing fluid from the fracturing manifold to the well fracturing tree via the one or more valves; and
at least one additional well fracturing tree coupled to the fracturing manifold by one or more additional valves of the at least one additional well fracturing tree;
wherein each well fracturing tree is coupled to a shared trunk line of the fracturing manifold and the shared trunk line includes a plurality of wellhead crosses and pipes extending between the plurality of wellhead crosses.

9. The fracturing system of claim 8, wherein the shared trunk line is configured to enable adjustments to the length and angular position of one or more portions of the shared trunk line.

10. The fracturing system of claim 8, wherein the fracturing manifold does not include a skid that supports one or more of the wellhead crosses of the fracturing manifold.

11. A method, comprising:
coupling a fracturing manifold to a first well fracturing tree to enable routing of fracturing fluid from the fracturing manifold to the first well fracturing tree;
coupling the fracturing manifold to a second well fracturing tree adjacent to the first well fracturing tree to enable routing of fracturing fluid from the fracturing manifold to the second well fracturing tree, wherein coupling the fracturing manifold to the first and second well fracturing trees includes coupling the fracturing manifold to valves that enable individual control of flow of fracturing fluids from the fracturing manifold to the first and second well fracturing trees; and
varying the length of the fracturing manifold by manipulating an adjustment joint of the fracturing manifold, wherein the fracturing manifold includes at least one pivot joint.

12. The method of claim 11, wherein coupling the fracturing manifold to the first well fracturing tree includes coupling a connection block of the fracturing manifold to a gate valve of the first well fracturing tree.

13. The method of claim 11, comprising fracturing a well with fracturing fluid provided from the fracturing manifold through the first or second well fracturing tree.

14. A fracturing system, comprising:
a plurality of well fracturing trees; and
a fracturing manifold coupled to each of the plurality of well fracturing trees, wherein the fracturing manifold includes at least one pivot joint and the at least one pivot joint enables a first portion of the fracturing manifold to be positioned at an angle with respect to a second portion of the fracturing manifold to accommodate variation in spacing and elevation differences between well fracturing trees of the plurality of well fracturing trees.

* * * * *